Aug. 18, 1970 D. G. CARTWRIGHT ET AL 3,524,931

MINIATURE INTERCOMMUNICATION KEY TELEPHONE SYSTEM

Filed Feb. 23, 1967

INVENTOR
D.G. CARTWRIGHT
E. PINEDE

BY
[signature]
ATTORNEY

United States Patent Office 3,524,931
Patented Aug. 18, 1970

3,524,931
MINIATURE INTERCOMMUNICATION KEY TELEPHONE SYSTEM

Delmar G. Cartwright, Edmonton, Alberta, and Edouard Pinede, Montreal, Quebec, Canada, assignors to International Telephone and Telegraph Corporation, New York, N.Y., a corporation of Delaware
Filed Feb. 23, 1967, Ser. No. 617,891
Int. Cl. H04m 9/00
U.S. Cl. 179—1 4 Claims

ABSTRACT OF THE DISCLOSURE

A miniature dial intercommunication system for use with key telephone systems features lamp flashing and repeated ringing. Electronically driven relays operate a miniature stepping switch. Circuitry is provided to enable use of the 1 digit as a station signal.

This invention relates to intercommunication equipment especially—although not exclusively—well suited for use in key telephone systems and more particularly to miniature intercommunication systems.

To those skilled in the art, the term "key telephone systems" generally refers to a telephone set provided with a plurality of keys or pushbuttons. If some of the keys are pushed, the telephone set may be selectively connected to any one of several telephone lines extending to a central office. Sometimes a "hold" key is provided to allow the subscriber to switch a connection from one line to another. Also, a key is generally provided for enabling the telephone set to be used as part of an intercommunication system, wherein any local subscriber may call any other local subscriber without going through the central office.

These key sets have come to have certain characteristics which are widely accepted by the subscriber and which are not likely to change in a retrogressive manner. Among other things, these parameters include such things as a maximum cabinet size which is acceptable to the subscriber—it is unlikely that the subscriber will accept a larger size. The cabinet size, in turn, limits the amount of equipment which can be located on the subscriber's premises.

Recently, these key systems have been "modernized" to use advanced technology, components, and production techniques. Among other things, the parts of a key system which have allowed it to make a connection with the central office line have been improved, but the intercommunication system has not been improved. The "modernization" process has bypassed some problem areas and left much to be desired in other areas so that the resulting key system has often been a somewhat makeshift assembly of new and old technology and components. Moreover, the "modernization" process has had to accept the operating methods which were used in earlier and existing equipment. For example, conventional key systems restrict the intercommunication network to nine stations; they have had excessive power supply requirements; they have offered only a limited mode of signaling.

Accordingly, an object of this invention is to provide new and improved key telephone systems. A more particular object is to provide key systems completely adapted to use modern technology, design, components, and techniques.

A further object of the invention is to provide a compact modern key telephone system using electronic and miniature electromechanical components (whichever is best suited) for mounting on printed circuit cards. In this connection, an object is to double the intercommunication system capacity without increasing either its physical size or its power supply requirements.

Another object is to provide a compact key system using the components which are best suited to provide a given function without regard as to whether the components are of an electronic or electromechanical nature and without sacrificing the opportunity for undertaking automatic manufacturing and gaining other advantages inherent to the newer style components. In fact, an object is to provide the electronic controls which enable a use of small electromechanical components.

In accordance with an aspect of this invention, a key telephone system is made primarily from printed circuit cards carrying electronic components. For those functions which electronic components cannot perform most efficiently, miniature electromechanical components are used in conjunction with electronic control circuits. The electromechanical components have the size and weight characteristics which are compatible with printed circuit cards and the other types of components normally supported on them. The electronic components are adapted to supply the capabilities required by, but not inherent in, the miniature electromechanical parts. This way, the entire system functions properly as an integrated unit using the best of modern technology.

The above mentioned and other objects and features of this invention and the manner of obtaining them will become more apparent, and the invention itself will be best understood by reference to the following description of an embodiment of the invention taken in conjunction with the accompanying drawings, in which.

Figures 1, 2:
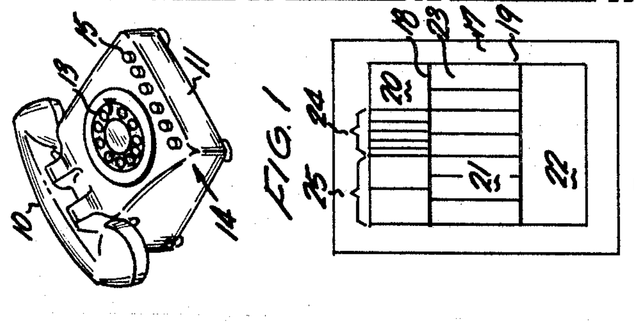
FIG. 1 shows an exemplary key telephone which may use the invention.
FIG. 2 shows the arrangement of equipment in a cabinet which may be located on a subscriber's premises to house the key telephone with an intercommunication system.

FIG. 1 shows the outward appearance of a very well-known telephone set for use with a key telephone system. Generally speaking, the telephone includes a hand set 10 resting on a base 11. The base includes any well-known control device 13 which may be a dial or a pushbutton tone controller, for example. Also mounted on the base are a number of pushbuttons 14.

Some of the pushbuttons 14 allow the user to connect the telephone with any selected one of a number of telephone lines which extend to a central office. Other of the pushbuttons 14 may perform special functions, such as holding a line during transfer, signaling another location, or the like.

One of the pushbuttons 15 generally provides a means for switching the telephone to an intercommunication mode of operations. That is, if the pushbutton 15 is pushed at a calling station, any one of the numbers "2"–"0" may be dialed. Thereafter, a sound is emitted from the telephone which is identified by the dialed number. If the telephone emitting the sound is answered, the calling and called subscribers may talk to each other by means of locally supplied power, without making any of the central office equipment busy to either incoming or outgoing calls.

FIG. 2 shows a cabinet of the type which is located on the subscriber's premises adjacent the telephone set of FIG. 1. The cabinet includes an outer housing 17 having two shelves 18, 19 therein. The space 20 above the shelf 18 is occupied by a small interrupter, which furnishes the locally used power for lights, ringing, or buzzing signals. The space 21 supports printed circuit cards which are used to terminate the lines from the central office. In prior art systems, the space 22 is generally occupied by the dial intercommunication equipment which is enabled when the button 15 is pushed.

The particular card position 23 is generally reserved for either a direct pushbutton manual intercommunication circuit or a line circuit. Generally, the equipment located here controlled intercommunication system is installed.

Next, it may be well to note a few of the problems inherent in the prior art key systems of the type described in connection with FIG. 2. First, the cabinet 17 is limited in maximum size to the dimensions which a subscriber will accept. The variety and number of sizes are limited by the costs to the manufacturer. Therefore, the manufacturer generally provides a single cabinet size for all installations—which size is the largest readily acceptable to the subscriber. One result is a waste of space inside the cabinet. Another drawback is that the equipment used heretofore tended to be large and bulky; therefore, the subscriber had to accept inferior service merely because it could not be conveniently fitted into the cabinet. For example, the intercommunication signal was a single buzz which sounded once and then did not repeat itself. There was no flashing lamp to identify the phone which was signalled during an intercommunication call. If a person was not near a phone when it buzzed, there was no way of knowing the person who was being called. If no other unrelated buzzers were in the area, it was difficult to know whether a buzz meant to answer the phone or to do something else.

In accordance with one aspect of the invention, the key telephone incorporates an intercommunication circuit small enough to be mounted on a printed circuit card in space 23. Since the manual and dial intercommunication systems are generally used alternatively, this space is almost never wasted, and there are few conflicting demands upon it. This frees the space 22 to provide service for another key system; thereby reducing by one half either the number or size of the wall boxes in the subscriber premises. The space 24 is used to receive a number of optionally available printed circuit cards which allow alternative modes of signaling (e.g. lamp flashing, continuous or interrupted ringing, or the like). The space 25 is used to provide a local supervision circuit having a quality generally found, heretofore, only in central office equipment. I provide this supervision circuit by use of a miniature stepping switch having dimensions in the order of 3 x 2.25 x 1 inches. The space 25 is divided in two parts to receive two such stepping switches, one associated with equipment mounted in space 21 and the other associated with equipment mounted in space 22. While I do not limit my invention thereto, I presently prefer to use a British made switch (Model 2250*c*) manufactured by the Associated Electric Industries Company.

Figure 3:
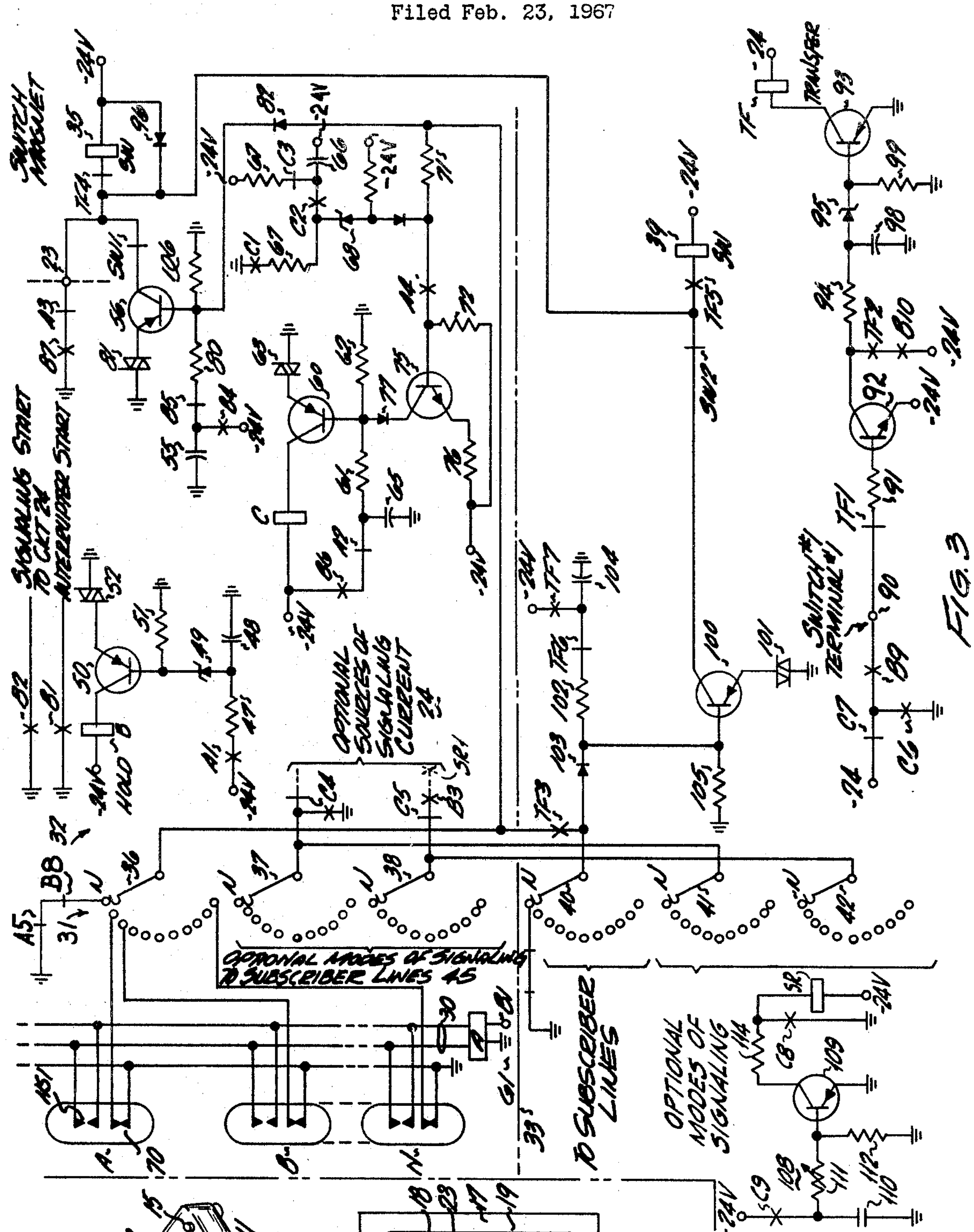
FIG. 3 shows an exemplary intercommunication system incorporating the principles of my invention.

FIG. 3 shows the circuit used to provide a dial controlled intercommunication circuit. Briefly, FIG. 3 shows a number of subscriber stations A, B . . . N having a common intercommunication talking circuit 30, a stepping switch 31, and a combined relay and electronic control circuit 32. The common talking path 30 is shared by all subscribers; however, each subscriber station is connected to a separate signal path, as shown at 45. This is, when operating in the intercommunication, the individual called subscriber's lamp flashes and telephone rings via either or both of the wipers 37, 38, according to the selection made by switch 31. However, all subscribers talk to each other via the same two wires 30. Since everyone uses the same talking wires, only one intercommunication call may occur at any given time. A horizontal dot-dashed line 33 separates a basic intercommunication circuit which serves ten stations from an add-on circuit which serves another ten stations. If the equipment in space 21 (FIG. 2) is duplicated in space 22 to provide for a second key system, it is not necessary to duplicate all of the intercommunication equipment shown above line 33. Instead, a simple add-on circuit (below line 33) may share some of the equipment (above line 33) provided for the first key system.

Each time that a motor magnet winding 35 is energized, all three wipers or brushes 36, 37, 38 take one step simultaneously over three banks of terminals with each set of three terminals being individually associated with a given subscriber station in a first group of ten stations. The upper level wiper 36 makes individual contact with different terminals in a bank of terminals which provide answer supervision control paths. The lower two wipers 37, 38 makes contact with banks of terminals which lead to the separate ones of the cards 24 that provide optional modes of signaling. For example, these options may provide flashing lamps which help identify the phone that is ringing, or usual or unusual signals to bells or buzzers. If the equipment below the line 33 is provided, the magnet 39 steps the wipers 40–42 with similar results, with respect to the second ten subscribers.

The remaining electromechanical components are miniature relays which might occupy a space in the order of one-and-one-half cubic inches. In this small size, the relays have their own unique characteristics which may or may not match the characteristics that the intercommunication circuit needs. Therefore, the relays are controlled by electronic components arranged to provide the necessary relay characteristics.

Since all of the remaining components are known devices, it is thought that the invention will be understood best from the following description of how the miniature intercommunication circuit operates. In the idle condiion, all of the switch wipers rest on their normal terminal "N," all relays are unoperated, and all transistors are in their non-conducting or cut-off state.

To place a call, a subscriber at a telephone set (such as A) removes a hand-set (not shown) and closes a set of hookswitch contacts HS1 to complete a loop across the talking conductors 30. Line relay A operates over an obvious circuit. The talking battery 24V (B1) and ground (G1) are supplied via the windings of the relay A.

The prior art dial intercommunication systems used in conjunction with key sets have been limited to the service of nine subscribers, because the digit "1" could reliably not be used to identify a subscriber station. This is because it is a common subscribed fault to fumble while picking up the hand set. Although the subscriber is not aware of his action, he sometimes picks up the telephone hand set drops it and picks it up again, thereby simulating a single dial pulse. Thus, if any subscriber is assigned the intercommunication number "1," in a prior art system, he is signaled every time that a hand set is so fumbled.

The invention provides means for serving ten intercommunication subscribers by preventing the circuit from logically interpreting hookswitch jiggles as dial pulses. This means includes an RC timer circuit 47, 48 which fires a Zener diode 49. In greater detail, responsive to the operation of relay A, contacts A1 close a circuit from a —24 v. battery through the resistor 47 and capacitor 48 to ground. For about 600 milliseconds, the capacitor 48 charges to a potential which causes the Zener diode 49 to reach a break down potential. Thereupon, the base of a PNP transistor 50 suddenly becomes negative relative to the emitter, and it turns on. The resistor 51 is part of the biasing circuit for the Zener diode 49 and the base of the transistor 50. The point to be noted here is that the 600 millisecond periods is long enough to eliminate hook switch jiggles because the relay will not operate, release and reoperate in a manner which enables the circuit to respond as it responds to dial pulses.

The transistor 50 is used in a common emitter configuration with its emitter clamped to ground through a varister 52. The collector is coupled to one side of the winding of hold relay B, the other side of the winding being coupled to a —24 v. battery. Thus, relay B opeartes after the transistor 50 turns on, i.e., it opeartes in about 600 milliseconds after the off-hook demand, when the capacitor 48 has charged sufficiently. Hold relay B closes its contacts B1 to mark a lead for starting the interrupter 20, FIG. 2. Any other of the optional signaling modes associated with the cards 24 is enabled when contacts B2 close. Contacts B3 close in preparation for supplying power to a signaling unit associated with a particular subscriber station. The remaining contacts on relay B close without immediate effect, except that capacitor 55 charges via contacts B4. Contacts B5 open to isolate the charged capacitor 55 from the base of a PNP transistor 56 for holding it cut off at this time.

The circuit is now ready to receive dial pulses. Since this is a relatively small system where users are aware of the system limitations, dial tone is not necessary; the subscriber merely removes a receiver and dials. However, dial tone may be provided in any well known manner or lamps may light from one or more of the circuits 24 to invite the subscriber to dial. The calling subscriber manipulates a standard telephone dial to send open loop dial pulses over line 30, each of which releases and reoperates the line relay A.

Means are provided for electronically holding the relay B operated during the dial pulses. More particularly, before each dial pulse appears, line relay A is operated so that contacts A1 are closed, and the capacitor 48 is charged. As each dial pulse is received, relay A releases, and contacts A1 open. The RC time constant is such that the charged capacitor 48 holds the base of the transistor 50 at an "on" bias for about two seconds, which is much more than a standard digit pulse period. At the end of each dial pulse, relay A reoperates; contacts A1 reclose; capacitor 48 recharges. Thus, the transistor 50 does not turn off, and the hold relay B is held operated by a current flowing from ground through varistor 52, the transistor 50, and the winding of relay B to a —24 v. battery.

According to the invention, relay C is first used to provide the function of a series relay and then reused to provide the function of an answer supervision relay. On its first or series use, relay C operates at the start of a dial pulse train and is held operated by the recurring dial pulses until the end of the pulse train, at which time it releases. The circuit for causing this function includes a PNP transistor 60 used in common emitter configuration The base bias for this transistor 60 is supplied via a pair of resistors 61, 62. The transistor 60 is connected to control the flow of current from ground through varistor 63, the emitter-collector circuit of the transistor 60, and the winding of relay C to a —24 v. battery.

When the first pulse in a train of dial pulses is received, the line relay A restores and contacts A2 close a circuit which may be traced from a —24 v. battery through operated contacts B6, A2 and the resistors 61, 62 to a ground potential. When the contacts A2 are closed, the capacitor 65 charges to —24 v., and at the same time make the base of the transistor 60 negative so that it turns on. With the transistor 60 turned on, a source of ground potential is connected through varistor 63 and transistor 60 to the winding of relay C which operates. At the end of each dial pulse, the line relay A reoperates and contacts A2 open; however, relay C does not release at once because the RC time constant of capacitor 65 and resistors 61, 62 is about 120 milliseconds. Hence, capacitor 65 discharges into the base of the transistor 60 and holds it on during the interpulse periods. After the end of the last pulse, in a train of dial pulses, contacts A2 remain open for a period of time which is longer than the discharge time of the capacitor 65. Near the end of such a discharge time period, the transistor 60 turns off, and relay C releases. This release of relay C is a signal to the associated equipment that a dial pulse train has ended.

When the series relay C operates at the start of a dial pulse train, contacts C1 and C2 close an obvious circuit from ground to a —24 volt battery for charging a capacitor 65 via a resistor 67; this RC circuit has a time constant of about two seconds. Since the longest acceptable pulse train does not persist more than one second, the charge on capacitor 66 does not rise during that pulse train to the breakdown potential of a Zener diode 68. Therefore, the charge accumulating on capacitor 66 is without effect at this time. When relay C releases at the end of a pulse train, contacts C2 open and C3 close to discharge the capacitor 66 quickly through resistor 67.

The circuit is arranged to drive the switch one step each time that a dial pulse is received. When the line relay A releases during each dial pulse, a circuit is closed from a source of ground potential through contacts B7, A3, and the winding of the switch magnet 35 to —24 volts. The magnet is energized without immediate effect. When the line relay A operates at the end of a dial pulse, contacts A3 open to release switch magnet 35, and the switch wipers 36–38 takes one step. At the end of the entire dial pulse train, the switch is standing on the set of terminals identified by the numerical value of the dialed digit.

In keeping with one aspect of the invention, means are provided for reusing the relay C to control the application of signaling current to the line. This current may be an interrupted ringing current, a lamp flashing current or any other well known form of signaling current depending upon the selection of the optional cards which plugged into the housing 17 at 24.

In greater detail, contacts C4, C5 close when relay C releases, thereby extending a circuit from any suitable power supply associated with a signal card 24, the circuit including wipers 37, 38 and a selected line 45 leading to the ringer or other signal device of the called station.

Relay C is reused as an answer supervision relay. More particularly, when the called subscriber answers, he pushes an intercommunication button 15 (FIG. 1) at the called station. This pushbutton closes contacts 70 (FIG. 3) and applies an answer supervision ground to the lead in a terminal in the bank selected by the wiper 36. At this time, relay A is operated because there is at least one telephone in an off-hook condition; hence, this ground is applied over a circuit including wiper 36, resistor 71, contacts A4, and the resistor 72 to a —24 v. battery. The base of an NPN transistor 75 (which operates in a common emitter configuration) is made positive relative to its emitter bias, as applied through resistor 76. Transistor 75 turns on and feeds current through a coupling diode 77 and into the base of the transistor 60, which also turns on.

When transistor 60 turns on, current flows from ground through varistor 63, transistor 60, and the winding of relay C (which operates) to a —24 volt battery. Contacts C4, C5 open to terminate the signaling current being extended to the called telephone. Contacts C1, C2 close to charge the capacitor 66 via the resistance 67. Two seconds thereafter, the charge on capacitor 66 reaches the breakdown potential of Zener diode 68, which fires. The voltage divisions are such that the transistors 75 and 60 are held in a turned on condition, and relay C remains operated. It might be recalled that the two second time delay of the RC network 67, 66 prevents the answer-supervision-type of response (now being described) when relay C operates as a series relay while dial pulses are received. Also, since relay C is being held independently of the answer supervision ground received over wiper 36, there is no danger that the called station will be rerung at the end of the call if that station releases first.

Conversation follows. Relays A, B and C are operated and the wipers 36–38 remain off-normal.

After the call is over, the subscribers hang up. When the last party goes on-hook, the loop across conductors 30 is broken, and the line relay A releases. The contacts A1 open and capacitor 48 discharges into the base of the transistor 50 for a period of time which is much longer than the open period of a standard dial pulse. Then, transistor 50 turns off and releases relay B.

When relay B releases contacts B5, 56 is made conductive responsive to the discharge of capacitor 55 into its base via resistor 80. Current flows from ground through varistor 81, transistor 56, contacts SW1 and the switch magnet 35 to a —24 v. battery. The switch drives itself home through the interrupter action of its contacts SW1. When wiper 36 reaches its normal contact N, while relays A and B are unoperated, ground is applied through contacts A5, B8, wiper 36, and diode 82 to the base of transistor 56 which turns off to stop the switch action.

After capacitor 65 discharges, transistor 60 turns off to release relay C. The circuit is now in an idle condition and ready for the next call.

The RC time constant of capacitor 55 and resistors 80 is two seconds and the self-drive speed of the switch 31 is 60 steps-per-second; thus, it is certain that switch 31 has enough time to drive itself home.

A more complicated—and perhaps more reliable—homing circuit may be used if the cost can be justified. Such a homing circuit would prevent use of the system until the switch reaches its normal position regardless of the time it takes. The two-second timing provided by the RC circuit 55, 80 is a lower cost arrangement justified here because the intercommunication system does not require the same high-grade of reliability normally expected from central office equipment.

The foregoing system may serve any number of up to ten subscriber stations. If the key system is made larger, it may serve up to nineteen subscribers if additional printed circuit cards are plugged in at 22 (FIG. 2) and a second stepping switch is plugged in at 25. The second switch includes the wipers 40–42; the printed circuit card includes the remaining components shown beneath the dot-dashed line 33 of FIG. 3. The first nine subscribers are numbered "2–0"; the second ten are numbered 10–19. Thus, there is no subscriber "1" because that digit is necessary to identify "tens" number, and it is reserved to command a changeover from the first to the second switch.

Contacts B9 close when the calling subscriber goes off-hook and relay B operates in the described manner. The calling subscriber dials "1," and relay C, operating in its series mode, closes contacts C6 while opening its contacts C7. The dial pulse train drives one of the wipers 36–38 to the first of its terminals—symbolically shown as the terminal 90. After a delay period following the end of the first dial pulse train (the digit 1), the relay C restores to open contacts C6 while closing the contacts C7. It should be noted that during the delay period after the switch reached terminal 90 and before the relay C restored, a circuit was completed from ground through contacts C6, B9, terminal 90, contacts TF1, and resistor 91 to the base of an NPN transistor 92. After the relay C restores at the end of the relay period following the first dial pulse train, contacts C6 remove ground and contacts C7 apply a negative battery to turn off the transistor 92. Thus, current flows through transistor 92 for a timed interval.

The transistor 93 turns on while current flows through the transistor 92, resistor 94, and diode 95. Transistor 93 turns on and energizes the transfer relay TF. Contacts TF2 close a holding circuit from a —24 v. battery through contacts B10, TF2, resistor 94 and diode 95 to the base of the transistor 93. Then contacts TF1 open to remove the control through the terminal 90.

Transfer relay TF closes contacts TF3 to connect wiper 40 to the junction of resistor 71 and diode 82. Contacts TF4 open the stepping circuit to the switch magnet 35 while contacts TF5 close the stepping circuit to the switch magnet 39. The diode 96 provides spark protection for both of the magnet windings 35, 39. Each time that contacts A3 open and then close responsive to a dial pulse, the magnet 39 responds to drive the wipers 40–42 one step, as described above in connection with magnet 35 and wipers 36–38.

After the subscribers hang up, the circuit formed by the combination of diode 95, capacitor 98, and resistor 99 makes the transfer relay TF slow to release to insure a proper response time. During this release time, the transistor 100 operates in the manner described above in connection with the transistor 56. The correspondence of circuit components is as follows; varistor 101=81, transistor 100=56, diode 103=82, resistor 102=80, contacts TF6, TF7=B5, B4, and capacitor 104=55. Both of the resistors 105, 106 are bias resistors.

From the foregoing, it should be apparent that the invention provides for use of the same control circuitry (above line 33) for both of the switches. The only thing required to add a second switch is a small amount of transfer circuitry (below line 33).

The foregoing speaks of optional modes of signaling and especially of means for giving interrupted ringing until the call is answered. A further embodiment of the invention provides means for giving a single ring as one of the optional modes of signaling. This option is most attractive to those subscribers who are familiar with older types of key telephone systems because they have come to rely upon the single ring as indicative of the type of call being received and the kind of action required.

To provide this single ring option, the wiper for one bank of the switch is connected to a source of continuous ringing current via contacts on a single ring relay SR which operates when a called telephone is reached. Thereafter, the called telephone is rung as long as the contacts of the relay SR remain closed. After a measured interval of time, relay SR releases, and the ringing current is terminated. Thereafter the called telephone may not be run again until a new call is placed.

In greater detail, the circuit for furnishing a single ring is shown at 108 in FIG. 3. Primarily, this circuit includes a PNP transistor 109 used in common emitter configuration and the single ring relay SR. If this single ring option is provided, contacts SR1 are inserted in the wire leading from a source of continuous ringing current which may be one of the optional sources 24 to wipers 38 and 42.

The circuit 108 operates this way. The relay C operates in the above described manner responsive to the receipt of the first dial pulse. The contacts C8 close and operate the single ring relay SR. The contacts C9 close to switch the transistor 109 into an on condition and to charge the capacitor 110. The contacts SR1 are now closed to prepare a circuit for transmitting a continuous ringing current to the wipers 38 and 42.

At the end of the pulse train, relay C releases to open contacts C8 and C9. The contacts C8 break the original operating circuit for relay SR; however, it can not release because the transistor 109 is turned on and supplying current from ground through the transistor 109, resistor 114, and relay winding SR to —24 v. battery. After contacts C9 open a discharging current through the capacitor 110 holds the relay SR operated. To reduce the size of the capacitor 110, the resistor 114 is made as large as possible to limit current to the lowest level which can reliably hold relay SR.

For any convenient period (such as two to six seconds, depending upon the setting of the potentiometer 111), the discharge of the capacitor 110 holds the transistor 109 in its turned on state. Relay SR remains operated, and ringing current is applied to the called line via contacts SR1. After the capacitor 110 discharges sufficiently, the transistor 109 turns off to release relay SR. Contacts SR1 open to terminate ringing.

While the principle of the invention has been described above in connection with specific apparatus and applications it is to be understood that this description is made only by way of example and not as a limitation in the scope of the invention.

We claim:

1. A key telephone system having an intercommunication circuit including a common talking path shared by a plurality of subscriber stations, multi-bank switch means operated responsive to subscriber sent dial pulses for selectively signalling individual ones of said subscriber stations, means comprising a combination of electronic and electromechanical devices for controlling said switch responsive to subscriber sent dial pulses, transistor means for distinguishing between hook switch jiggles and dial pulses, said transistor means being biased by delaying means to be switched only responsive to a pulse having a certain predetermined length, means responsive to said transistor means being switched for driving said switch means responsive only to said dial pulses, signal current transmitting means for transmitting a signal current through at least one of said banks to the subscriber station selected by said dial pulses, said signal current transmitting means comprising means for transmitting any selected one of many different forms of signalling current through a selected terminal in said one bank, means for transmitting a different one of said many signalling currents through another of said banks, means responsive to the answer by the called party for sending answer supervision signals through a second of said banks, and means responsive to said answer supervision for terminating the transmission of said signalling current through said first bank.

2. The system of claim 1 and means whereby said answer supervision responsive mean terminates all of said signalling currents.

3. The system of claim 2 and a second multi-bank switch means, means utilizing said combination of devices for driving said first mentioned switch responsive to the recept of a first train of dial pulses, and means also utilizing said combination of devices for driving said second switch responsive to the receipt of a second train of dial pulses.

4. The system of claim 3 and means responsive to said first train of dial pulses for driving said first mentioned switch to signal either any one of nine subscriber stations or to change over the said second switch, and means responsive after said change over to said second train of dial pulses for driving said second switch to signal any one of ten additional subscriber stations.

References Cited

UNITED STATES PATENTS

| | | | |
|---|---|---|---|
| 2,117,488 | 5/1938 | Lomax et al. | |
| 2,883,457 | 4/1959 | Carter et al. | |
| 3,100,244 | 8/1963 | King et al. | |
| 3,278,690 | 10/1966 | Van Horn | 179—37 |

KATHLEEN H. CLAFFY, Primary Examiner

J. S. BLACK, Assistant Examiner

U.S. Cl. X.R.

179—37